(12) United States Patent
Celorio (10) Patent No.: US 10,406,466 B2
(45) Date of Patent: Sep. 10, 2019

(54) URBAN LUNG SYSTEM AND METHOD TO SEPARATE PARTICULATE MATTER AND OTHER TOXIC ELEMENTS FROM THE ATMOSPHERIC AIR BY USING KINETIC ENERGY MEANS

(71) Applicant: Victor Manuel Celorio, Gainesville, FL (US)

(72) Inventor: Victor Manuel Celorio, Gainesville, FL (US)

( * ) Notice: Subject to any disclaimer, the term of this patent is extended or adjusted under 35 U.S.C. 154(b) by 238 days.

(21) Appl. No.: 15/449,958

(22) Filed: Mar. 5, 2017

(65) Prior Publication Data

US 2018/0250619 A1    Sep. 6, 2018

Related U.S. Application Data

(60) Provisional application No. 62/304,476, filed on Mar. 7, 2016.

(51) Int. Cl.
| | |
|---|---|
| *B01D 45/02* | (2006.01) |
| *B01D 53/04* | (2006.01) |
| *B01D 39/04* | (2006.01) |
| *B01D 50/00* | (2006.01) |
| *B01D 46/00* | (2006.01) |

(52) U.S. Cl.
CPC ............ *B01D 45/02* (2013.01); *B01D 39/04* (2013.01); *B01D 46/00* (2013.01); *B01D 50/002* (2013.01); *B01D 53/04* (2013.01); *B01D 2253/102* (2013.01); *B01D 2257/70* (2013.01); *B01D 2259/4558* (2013.01); *B01D 2259/4566* (2013.01); *Y02A 50/2352* (2018.01)

(58) Field of Classification Search
USPC .................................... 55/356, 385.1; 96/108
See application file for complete search history.

(56) References Cited

U.S. PATENT DOCUMENTS

| | | | | |
|---|---|---|---|---|
| 5,147,429 A | * | 9/1992 | Bartholomew | B01D 46/42 244/30 |
| 5,509,853 A | * | 4/1996 | Wells | B01D 46/0052 454/370 |
| 6,212,882 B1 | * | 4/2001 | Greger | B01D 53/944 60/274 |
| 7,118,608 B2 | * | 10/2006 | Lovell | B01D 53/0415 55/385.1 |
| 7,416,518 B2 | * | 8/2008 | Cardinale | A61H 1/005 482/1 |

(Continued)

*Primary Examiner* — Nina Bhat (57) ABSTRACT

The system to be installed on a vehicle to purify air using kinetic energy generated by movement of the vehicle is presented. The system comprises at least one kinetic air purifier structure which is an air conduit having a first particle collection chamber and a second particle separation chamber. Each chamber comprises at least one convex element that provides obstacle to the air flow to separate large particles from the air flow, at least one trapping element, such as cotton fabric, to trap smaller dirt particles, and at least one chamber orifice that allows access to the chambers for cleaning purpose. The system further comprises a micro-porous trapping element to trap micro particles. Due to separated and trapped particles at various chambers, the air is purified. The air purification is achieved by capturing the dirt particles instead of diminishing those.

10 Claims, 7 Drawing Sheets

(56) References Cited

U.S. PATENT DOCUMENTS

| | | | |
|---|---|---|---|
| 9,034,066 B2* | 5/2015 | Brown | B01D 46/42 55/337 |
| 9,320,999 B2* | 4/2016 | Abell | B01D 46/10 |
| 2005/0000197 A1* | 1/2005 | Krantz | B01D 53/0407 55/385.3 |
| 2010/0186357 A1* | 7/2010 | Takeda | F24F 3/1603 55/471 |

* cited by examiner

URBAN LUNG SYSTEM AND METHOD TO SEPARATE PARTICULATE MATTER AND OTHER TOXIC ELEMENTS FROM THE ATMOSPHERIC AIR BY USING KINETIC ENERGY MEANS

BACKGROUND

The contamination floating in the air of any urban area is known as smog. Smog is a gray cloud composed of hundreds of toxic elements, particulate matter of different sizes, chemical elements which are the byproduct of human activity and gases such as CO2 (Carbon Dioxide) and Ozone.

BRIEF SUMMARY OF THE INVENTION

The present invention turns one of the major contributors to the smog, the internal combustion vehicles, into cleaning units which use the kinetic energy derived from the movement of those vehicles though the streets to extract the pollutant elements from the air, and captures them to be disposed of in a safe manner.

DESCRIPTION

Figure 1:
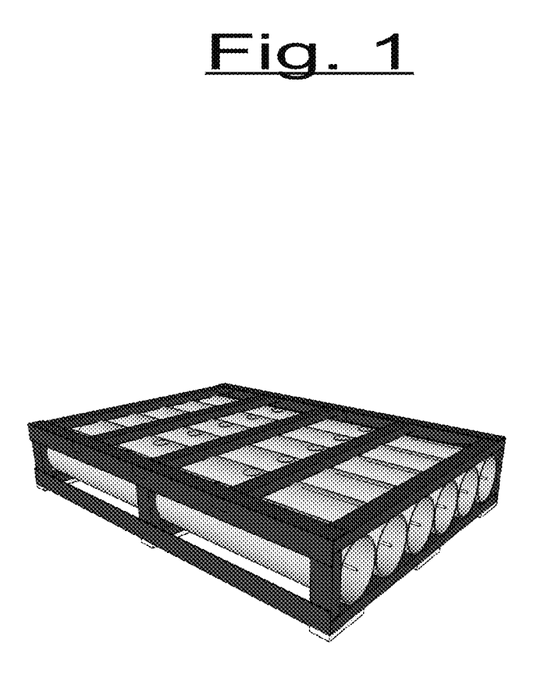
FIG. 1 is a top lateral view of an embodiment of the invention, in the form of several kinetic air purifiers aggregated to form a single unit which is denominated as an Urban Lung, and it is meant to be placed on top of vehicles.

The present invention relates to a System and Method (FIG. 1) that uses only kinetic energy to clean the contamination present in the atmospheric air, in a passive manner, without using any other type of energy that would increase the contamination instead of diminishing it. The contamination floating in the air of any urban area is known as smog. This smog is a gray cloud composed of hundreds of toxic elements, particulate matter of different sizes, chemical elements which are the byproduct of human activity and gases which are naturally present in the atmospheric environment such as CO2 (Carbon Dioxide) and Ozone.

Figure 2:
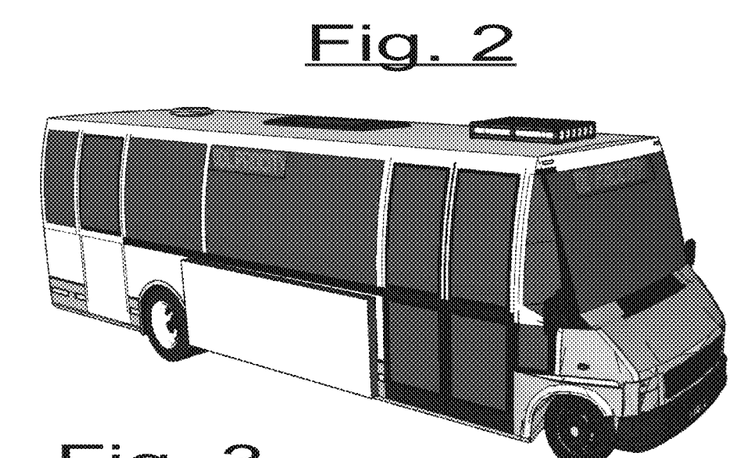
FIG. 2 and FIG. 3 are representations of different vehicles and the position and placement of the invention on their roofs, so as to better capture dirty air.
Figure 3:
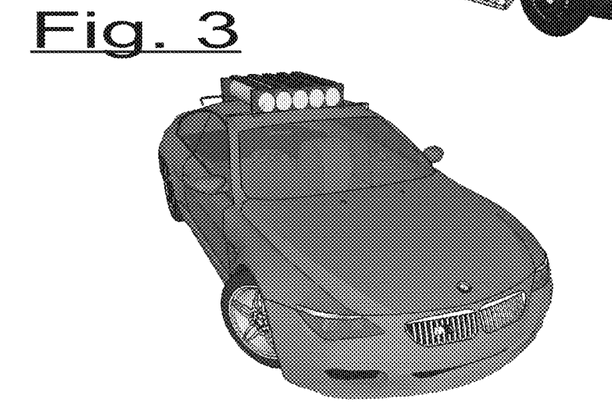
Figure 4:
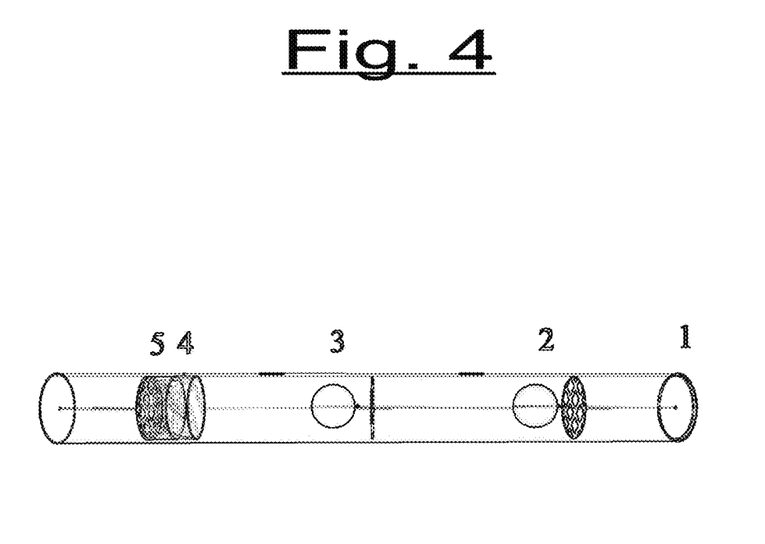
FIG. 4 a general block diagram of a single kinetic air purifier, which describes the different stages within the purifier: 4.1.—Main air intake port; 4.2.—a protector screen; 4.3.—a first convex element; 4.4: a first trapping element; 4.5: a second convex element; 4.6: a second trapping element; 4.7: micro-porous trapping element; 4.8: an air outlet port; 4.9: a first chamber orifice; 4.10: a second chamber orifice; 4.11: a first particle collection chamber; 4.12: a second particle collection chamber.

In a preferred embodiment, the present invention uses the internal combustion vehicles (FIG. 2 and FIG. 3) which are one of the major contributors to the smog, to install air purifying means (FIG. 1) that use the kinetic energy derived from the movement of those vehicles as they travel their normal routes, to extract the pollutant elements from the air and to capture them, to be disposed of later and in a safe manner (FIG. 4).

Advantageously, the System and Method described in this new invention eliminates the need of a filter element to clean the particulate matter from the environmental air, which is the solution used by most air cleaners. Those filter elements create air resistance, clog easily and require constant and expensive maintenance.

Moreover, the present invention avoids the main issue found in other air cleaners, which require strong energy means to suck in the air and push it through filters that retain the particulate matter carried by the air. Furthermore, each of those commercial appliances clean only a certain quantity of dirty air found near its surroundings. Such devices are an ecological contradiction and paradox because the enormous amount of energy that is required to move large amounts of air would itself produce a contamination equal or worse than the amount of pollutants collected.

In a preferred embodiment, at the center of the present invention, there is a kinetic purifier which works passively and has no moving parts. (FIGS. 4 and 5) The present invention described herein, works without requiring electricity to process and purify large amounts of dirty air. FIG. 4 describes a cross section view of a kinetic air purifier structure. The kinetic air purifier structure is a tubular structure that serves as an air conduit for air purification process. The kinetic air purifier includes an air intake port (4.1), a protector screen (4.2), a first particle collection chamber (4.11), a first convex element (4.3), a first trapping element (4.4), a second particle collection chamber (4.12), a second convex element (4.5), a second trapping element (4.6), a micro-porous trapping element (4.7), and an air outlet port (4.8). The air intake port allows ingress of polluted air inside the air conduit. The air flows through the protector screen for screen large particles or insects. The air then enters the first particle collection chamber. The first particle collection chamber includes the first convex element which, in one example, can be a spherical object. The convex element is placed at a center of the passageway to obstruct the flow of the air. Obstruction results in reduction of width and height of the passageway. Air flowing through the smaller passageway gain velocity and reduces the pressure.

Once the air flow is passed through the convex element, the air flows through the passageway with original width and height which results in reduced velocity and increased pressure. Change in velocity and the pressure causes turbulence in the first particle collection chamber, which subsequently results into separation of particulate matter from the air flow. The separated particulate matter is trapped inside the first particle collection chamber. The air further flows through the first trapping element which, in one example, can be a cotton fabric. The first trapping element entraps particulate matter with particles of smaller size relative to the particles separated at the convex element. The first particle collection chamber further includes a first chamber orifice (4.9) that allows access to the first particle collection chamber for cleaning purpose. Particles entrapped inside the chambers can be cleaned and the first trapping element can be changed. The second particle collection chamber is provided to perform same functionality such as the first particle collection chamber. The second particle collection chamber entraps particles of smaller size relative to the size of particles entrapped inside the first particle collection chamber. A second chamber orifice (4.10) allows access to the second particle collection chamber for cleaning purpose.

In the present invention the dirty air is not aspirated; it is forced to circulate inside the purifier walls by the kinetic energy transferred from the vehicles where the purifier is mounted and in such a manner that the air carrying the particulate matter must flow through a separator chamber means. As reference, the kinetic energy is the same that allows the planes to fly. The movement of the vehicle transfers energy from the air as it is guided through the particle matter separator means and the toxic gasses adsorber means.

Figure 5:
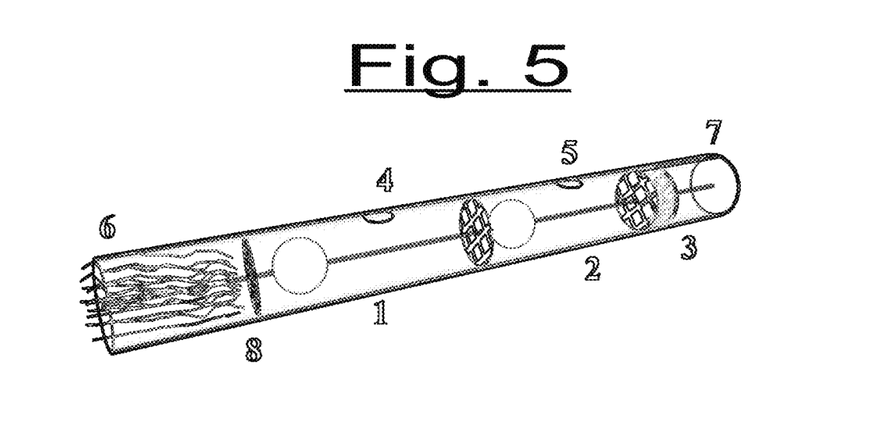
FIG. 5 is a cross section of a single kinetic air purifier embodiment, which describes in more detail the different actions that the purifier forces the dirty air to perform as it travels inside the purifier according to the principles described in the present invention: 5.1.—Main air intake port; 5.2.—a protector screen; 5.3.—a first convex element; 5.4: a first trapping element; 5.5: a second convex element; 5.6: a second trapping element; 5.7: micro-porous trapping element; 5.8: an air outlet port; 5.9: a first chamber orifice; 5.10: a second chamber orifice; 5.11: a first particle collection chamber; 5.12: a second particle collection chamber.

FIG. 5 depicts a cross-sectional view of the kinetic air purifier (5). In a preferred embodiment an air intake port (5.1) provides an intake passageway for surrounding polluted air to ingress. A protector screen (5.2) prevents largest particles and insects, entered into the purifier with the air flow, from flowing further. The air then enters the first particle collection chamber. At the first particle collection chamber, the air passes over surface of a first convex element, dropping the particulate matter inside the chamber. The air then flows through a first trapping element where further particulate matter is adsorbed. The air enters into a second particle collection chamber. At the second particle collection chamber (5.12), the air passes over the surface of a second convex element (5.5), dropping the particles inside the second particle collection chamber (5.12). The air further flows through a second trapping element (5.6) which adsorbs remaining dirt particles. At this stage, air is clean and dirt free. If micro size elements, such as toxic gases, are still present in the air, such elements are adsorbed by a micro-porous trapping element (5.7) when the air passes through the last element of the kinetic air purifier. The clean, dirt free, and toxic element free air exists the purifier through an air outlet port (5.8).

As contaminated air enters the kinetic air purifier through the air intake port (4.1), the particles of matter floating on said air are separated from the gaseous elements through at least one means that apply three well-known physical effects.

The first is the Bernoulli Principle which holds that the pressure in a stream of fluid is reduced as the speed of the flow is increased. This principle is applied in an advantageous manner in the new invention through the application of the Venturi effect which holds that the pressure in the air decreases as the velocity of the air increases as it passes through a smaller section area in the air passways.

As the dirty air moves within a closed space passway and that space then decreases its width and height, the speed of the air increases and thus it reduces its pressure. FIG. 4, element 4.3

The reduction of the passways is achieved by suspending at least one convex or spherical reducer element at the center of the air passways section (FIG. 4, elements 4.3 and 4.5). The spherical surface of the reducer triggers a third kinetic energy effect called Coanda which is the tendency of a fluid let to stay attached to a convex surface.

Figure 7:
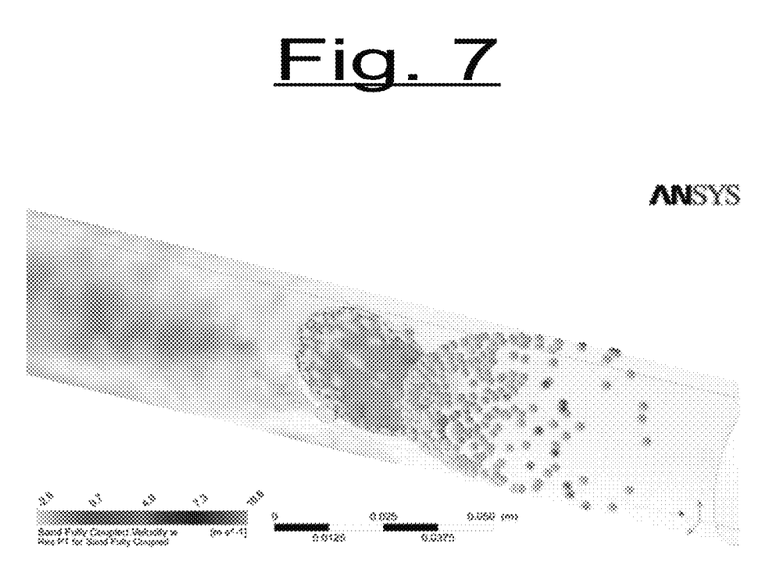
FIG. 7 is an X Ray view of the particulate matter inside the kinetic air purifier as it floats in the dirty air and approaches the Convex element.
Figure 8:
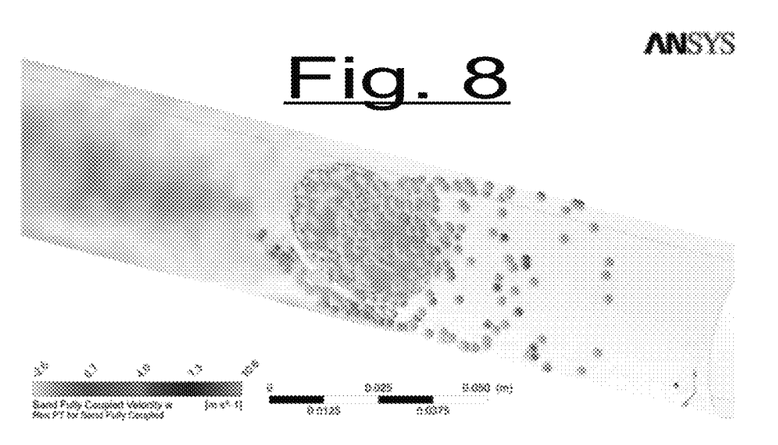
FIG. 8, is an X Ray view of the particulate matter inside the kinetic air purifier as it floats in the dirty air and the particulate matter is separated from the air as it moves over the Convex element.

The dirty air circulates around the convex surface of the convex element following closely its surface at the same time that the passway first reduces its width and then expands again. (FIG. 7). The volume of air is thus divided as it passes through the smaller spaces around the reducer means and the air accelerates its speed and loses pressure at the same time (FIG. 8).

Figure 9:
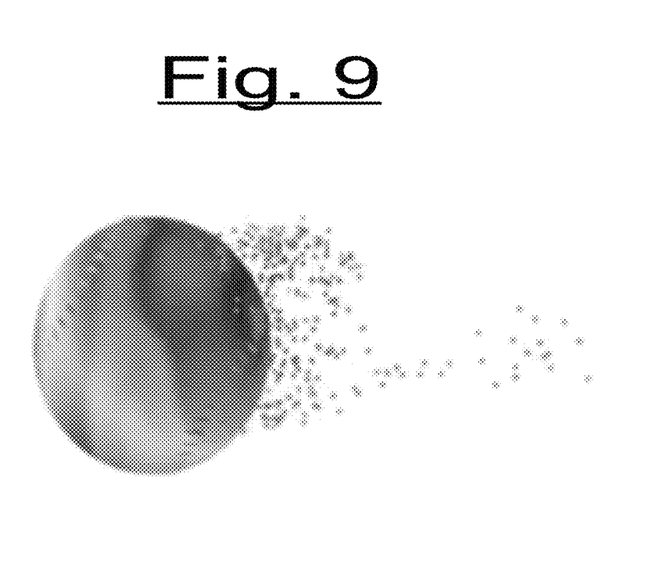
FIG. 9 is a different perspective of the particulate matter as it moves over the convex means
Figure 10:
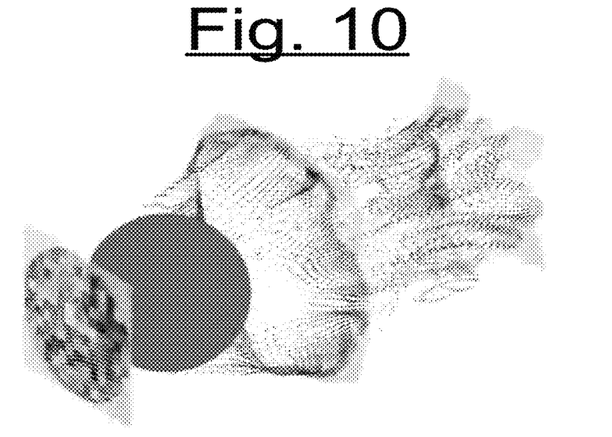
FIG. 10 shows the Particulate Matter as it is agitated and separated from the air by the turbulence created by the air movement behind the convex element.
Figure 11:
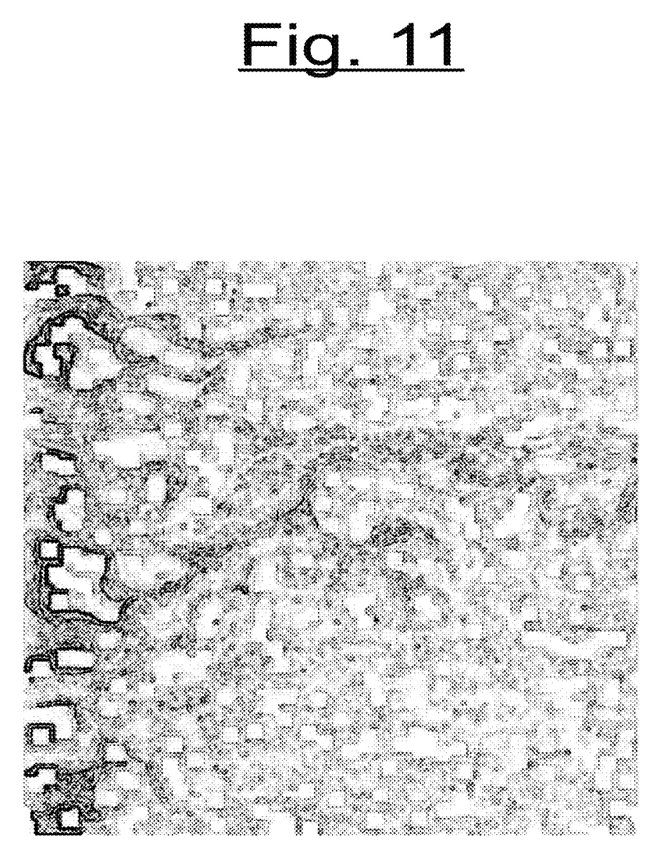
FIG. 11 is a cross section perspective in X-ray of the micro-porous trapping element and the gases get trapped inside.

As the dirty air goes around the convex element, the air slows its speed again as the passways means expand and the particles of matter are carried by the fluid at different speeds from different angles around the convex element. At the center of the back of the convex element the crosscurrents cause turbulence. The turbulence is created in the central point of the rear part of the convex element because the air advances on all sides of the sphere except in the back central part of the convex element. This turbulence causes the air to disperse and separate the particles of matter from the gaseous elements. (FIG. 9)

Figure 6:
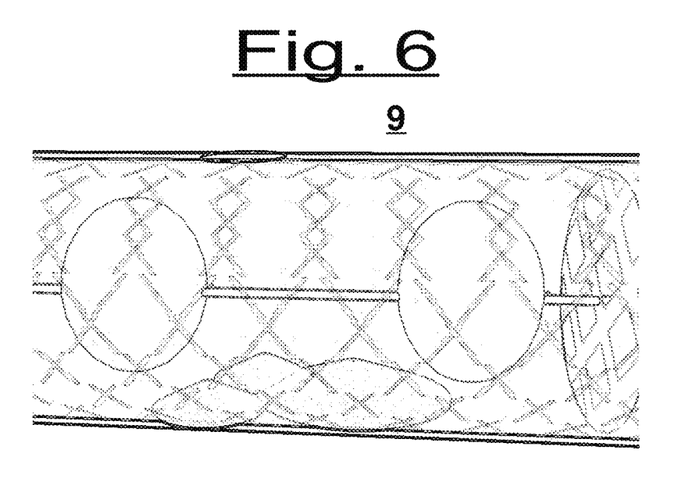
FIG. 6—is a close up of the accumulation of Particulate Matter inside the kinetic air purifier.

The particles of toxic matter, heavier than air, lose the support of the pressure-less air current and fall due to the force of gravity. They are deposited in the bed of the first and second particle collection chambers (FIG. 6).

In a preferred embodiment, the kinetic air purifier repeats the same process in a second particle collection-chamber, to pick up the smaller particles that the first particle collection chamber may have missed. (FIG. 4 element 4.12)

Furthermore, to insure the smaller particles which may have not fallen in the previous separation process, there is the second trapping element made out of multitude of individual fibers, such as cotton natural or synthetic, which allow the trapping of small particles without impending the flow of air. FIG. 4, element 4.6

The cleaner, particle-less air continues its way to the micro-porous trapping element FIG. 4, element 4.7.

The micro-porous trapping element is composed of at least one means of micro-porous element, either natural such as activated vegetal carbon from coconut shell, or a synthetic material composed of micro-porous where elements such as acidic toxic compounds, acetates, and organic chemicals are adsorbed. (FIG. 9)

Thus, the present and original invention called Kinetic Air Purifier, is an economical and feasible option to implement in all urban areas to clean the smog out of the sky by purifying massive amounts of dirty air without using a penny of electricity and without having to use and change filters.

The passive operation of the kinetic air purifier allows the accumulation and periodic collection of the toxic particles that accumulate in the first and second particle collection chamber. (FIG. 6) without filters to replace. The chamber(s) are opened periodically, and the particles are aspirated safely. The micro-porous trapping element are changed periodically as its micro-porous get saturated. The micro-porous trapping element are reconstituted and reused.

I claim:

1. A system mounted on a vehicle and operated by a kinetic energy generated by the movement of the vehicle comprising,
   at least one kinetic air purifier structure, an air conduit to convey the air,
   an air intake port,
   a protector screen to prevent one or more heavy objects mixed in the air,
   a first particle collection chamber comprising,
      a first convex element, wherein the air passes over the first convex element surface for separating particles from the air, and
      a first trapping element to trap particles smaller in size with respect to the particles separated at the first convex element,
   a second particle collection chamber to separate remaining particles from the air comprising,
      a second convex element, wherein the air passes over the second convex element surface for separating particles from the air, wherein the particles are smaller in size with respective to the particles separated at the first particle collection chamber, and
      a second trapping element to trap particles smaller in size with respect to the particles separated at the second convex element,
      a micro-porous trapping element to trap micro particles from the air, and
   an air outlet port.

2. The system as claimed in claim 1, wherein the first particle collection chamber comprises a first chamber orifice for providing access to the first particle collection chamber to a user to collect the particles and clean the first particle collection chamber, and wherein the second particle collection chamber comprises a second chamber orifice for providing access of the second particle collection chamber to a user to collect the particles and clean the second particle collection chamber.

3. The system as claimed in claim 1, the first and second convex elements can be a spherical shaped element.

4. The system as claimed in claim 3, the first and second convex element can be placed in center of an air passageway section for reducing height and width of passageway available for the air to pass through.

5. The system as claim in claim 4, wherein the reduction in size of the air passageway results in increased air velocity and decreased air pressure.

6. The system as claimed in claim 4, wherein the air is passed through the first and second convex element, the air velocity is decreased due to increased height and width of the air passageway, and wherein plurality of particles of different sizes and weight is carried by the air at different speed and different angles creates turbulence.

7. The system as claimed in claim 6, wherein the turbulence causes separation of the particles and gaseous elements of the air.

8. The system as claimed in claim 1, wherein the first and second trapping elements is selected from natural or synthetic cotton that can trap dirt particles without impending the flow of air.

9. The system as claimed in claim 1, wherein the micro-porous trapping element is an activated vegetal carbon from coconut shell.

10. The system as claimed in claim 1, wherein the micro-porous trapping element is an activated vegetal carbon from coconut shell to absorb acidic toxic compounds, acetates, and organic chemicals.

\* \* \* \* \*